(12) United States Patent
Lee et al.

(10) Patent No.: US 12,724,324 B2
(45) Date of Patent: Sep. 1, 2026

(54) LENS ASSEMBLY

(71) Applicant: SAMYANG OPTICS CO., LTD, Changwon-si (KR)

(72) Inventors: Ji Hoon Lee, Gunpo-si (KR); Hyun Hee Lee, Seoul (KR)

(73) Assignee: SAMYANG OPTICS CO., LTD, Changwon-si (KR)

( * ) Notice: Subject to any disclaimer, the term of this patent is extended or adjusted under 35 U.S.C. 154(b) by 291 days.

(21) Appl. No.: 18/685,115

(22) PCT Filed: Aug. 24, 2021

(86) PCT No.: PCT/KR2021/011282
§ 371 (c)(1),
(2) Date: Feb. 20, 2024

(87) PCT Pub. No.: WO2023/027205
PCT Pub. Date: Mar. 2, 2023

(65) Prior Publication Data
US 2024/0393662 A1 Nov. 28, 2024

(51) Int. Cl.
*G03B 13/36* (2021.01)
*G02B 7/14* (2021.01)

(52) U.S. Cl.
CPC ............... *G03B 13/36* (2013.01); *G02B 7/14* (2013.01)

(58) Field of Classification Search
None
See application file for complete search history.

(56) References Cited

U.S. PATENT DOCUMENTS

2007/0285556 A1* 12/2007 Nakahara ............... G03B 13/36 348/345

FOREIGN PATENT DOCUMENTS

| | | | | | |
|---|---|---|---|---|---|
| CN | 102998877 | A | * | 3/2013 | ........... H04N 23/663 |
| JP | H11202400 | A | * | 7/1999 | |
| JP | 2005099084 | A | * | 4/2005 | |
| JP | 2010191585 | A | * | 9/2010 | ......... H04N 1/00458 |
| JP | 4590891 | B2 | * | 12/2010 | |
| JP | 2011-053550 | A | | 3/2011 | |
| JP | 2016-059033 | A | | 4/2016 | |
| JP | 2020095275 | A | * | 6/2020 | |
| KR | 10-2014-0086540 | A | | 7/2014 | |
| KR | 10-2019-0143810 | A | | 12/2019 | |

OTHER PUBLICATIONS

International Search Report issued in PCT/KR2021/011282; mailed May 19, 2022.

* cited by examiner

*Primary Examiner* — Rodney E Fuller
(74) *Attorney, Agent, or Firm* — Studebaker Brackett PLLC

(57) ABSTRACT

Provided are a lens assembly including, a barrel detachably coupled to a camera, a focusing lens, a driving unit moving the focusing lens by generating a driving force with power supplied from the camera, an input button receiving a user command, and a control device controlling the driving unit to move the focusing lens to a preset custom focus position when a custom focus adjustment command is input through the input button.

5 Claims, 7 Drawing Sheets

231 210 250
220
291
Ax
292
211
C
M
280 240 230

LENS ASSEMBLY

CROSS-REFERENCE TO RELATED APPLICATIONS

This application is a U.S. National Stage of International Application No. PCT/KR2021/011282 filed Aug. 24, 2021, the entire content of which is incorporated herein by reference.

TECHNICAL FIELD

The present disclosure relates to a lens assembly, and more particularly, to a lens assembly which stores focus information of a lens and adjusts the focus of the lens based on the focus information according to a user's selection.

BACKGROUND ART

A lens assembly may not necessarily be manufactured by the same maker of a camera body. A lens assembly manufactured by a specific maker can be compatibly coupled to different cameras manufactured by different makers.

Meanwhile, since a lens assembly receives only limited information from a camera, adjusting the focus of the lens assembly through the camera may be at a limited level.

Accordingly, there is a need for an invention that enables the lens assembly itself to adjust focus.

DISCLOSURE

Technical Problem

Aspects of the present disclosure provide a lens assembly which stores focus information of a lens and adjusts the focus of the lens based on the focus information according to a user's selection.

However, aspects of the present disclosure are not restricted to the one set forth herein. The above and other aspects of the present disclosure will become more apparent to one of ordinary skill in the art to which the present disclosure pertains by referencing the detailed description of the present disclosure given below.

Technical Solution

According to an aspect of the present disclosure, there is provided a lens assembly comprising: a barrel detachably coupled to a camera: a focusing lens; a driving unit moving the focusing lens by generating a driving force with power supplied from the camera; an input button receiving a user command; and a control device controlling the driving unit to move the focusing lens to a preset custom focus position when a custom focus adjustment command is input through the input button.

An operation mode of the control device comprises a custom mode and a non-custom mode, and the control device controls the driving unit to move the focusing lens to the custom focus position when the custom focus adjustment command is input after the operation mode is switched to the custom mode.

The control device switches the operation mode to the custom mode when detecting the selection of the input button while receiving initial power from the camera.

The control device switches the operation mode to the non-custom mode when not detecting the selection of the input button while receiving initial power from the camera.

The custom focus adjustment command comprises selecting the input button for a preset threshold range of time.

An operation mode of the control device comprises a custom mode and a non-custom mode, and the control device stores a current position of the focusing lens as the custom focus position when a custom focus storage command is input after the operation mode is switched to the custom mode.

The custom focus storage command comprises selecting the input button for more than a preset threshold time.

The lens assembly further comprises an output unit which outputs the operation mode of the control device.

The output unit outputs light of different colors in the custom mode and the non-custom mode.

Other details of the present disclosure are included in the detailed description and the drawings.

Advantageous Effects

A lens assembly according to an embodiment of the present disclosure described above stores focus information of a lens and adjusts the focus of the lens based on the focus information according to a user's selection. Therefore, it is possible for the lens assembly itself to store and adjust the focus without using the camera.

MODE FOR INVENTION

Figure 1:
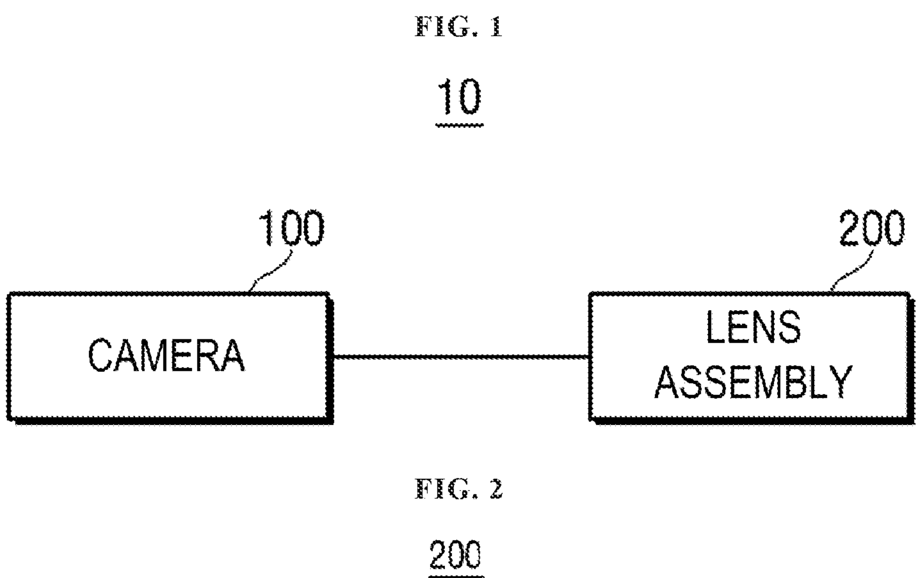
FIG. 1 illustrates an optical system according to an embodiment of the present disclosure.

Advantages and features of the disclosure and methods to achieve them will become apparent from the descriptions of exemplary embodiments herein below with reference to the accompanying drawings. However, the inventive concept is not limited to exemplary embodiments disclosed herein but may be implemented in various ways. The exemplary embodiments are provided for making the disclosure of the inventive concept thorough and for fully conveying the scope of the inventive concept to those skilled in the art. It is to be noted that the scope of the disclosure is defined only by the claims. Like reference numerals denote like elements throughout the descriptions.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

FIG. 1 illustrates an optical system according to an embodiment of the present disclosure.

Referring to FIG. 1, an optical system 10 according to an embodiment of the present disclosure includes a camera 100 and a lens assembly 200.

The camera 100 may generate an image of a subject. For example, the camera 100 may include an image sensor such as a charge coupled device (CCD) or a complementary metal oxide semiconductor (CMOS). Light input to the camera 100 may be detected by the image sensor, and the detected light may be converted into an electrical signal to generate a digital image.

The lens assembly 200 is coupled to the camera 100 and focuses input light and transmits the focused light to the camera 100. To this end, the lens assembly 200 may include a plurality of lenses. At least one of the lenses may be a focusing lens for adjusting a focal distance to a subject. The position of the focusing lens may be adjusted, and the focal distance to the subject may vary according to the adjusted position.

The lens assembly 200 may receive power from the camera 100 and operate with the supplied power. For example, the lens assembly 200 may include a driving unit for moving the focusing lens, and the driving unit may operate with the power supplied from the camera 100 to move the focusing lens. In addition, the lens assembly 200 may communicate with the camera 100 to receive an operation signal of the camera 100 from the camera 100 or may transmit its own operation signal to the camera 100.

The lens assembly 200 according to an embodiment of the present disclosure may independently adjust the position of the focusing lens regardless of the operation signal received from the camera 100. In particular, the lens assembly 200 may move the focusing lens to a preset custom focus position. Moving the focusing lens to the custom focus position may not be performed by the operation signal received from the camera 100, but may be performed when a user command is input through an input unit provided in the lens assembly 200.

The structure and function of the lens assembly 200 will now be described in detail with reference to FIGS. 2 through 10.

Figure 2:
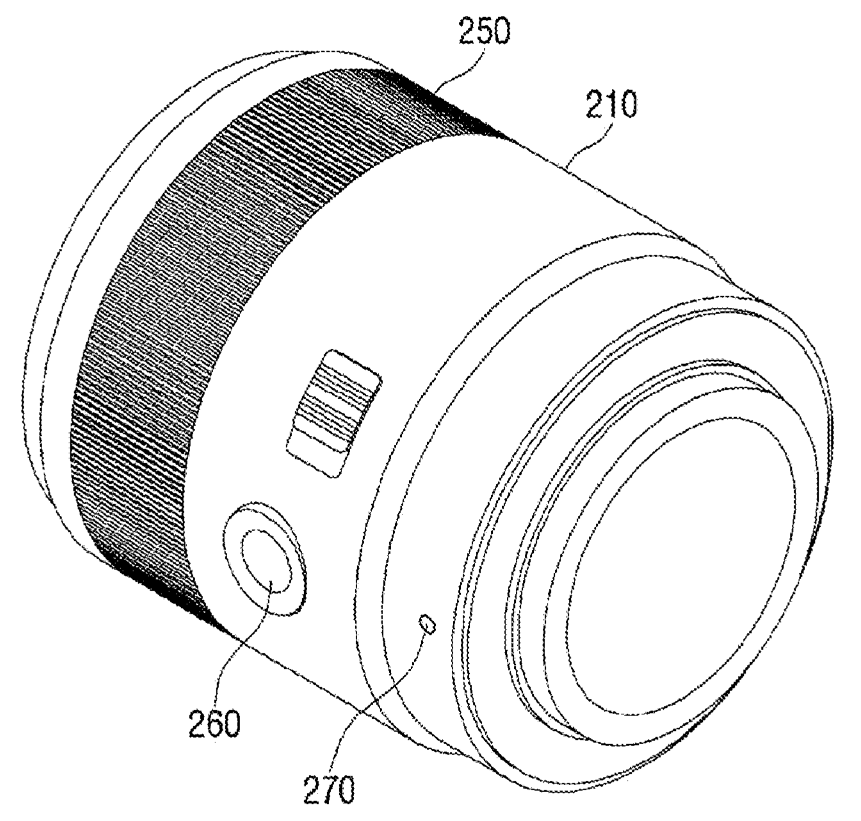
FIG. 2 illustrates a lens assembly according to an embodiment of the present disclosure.
Figures 3, 4:
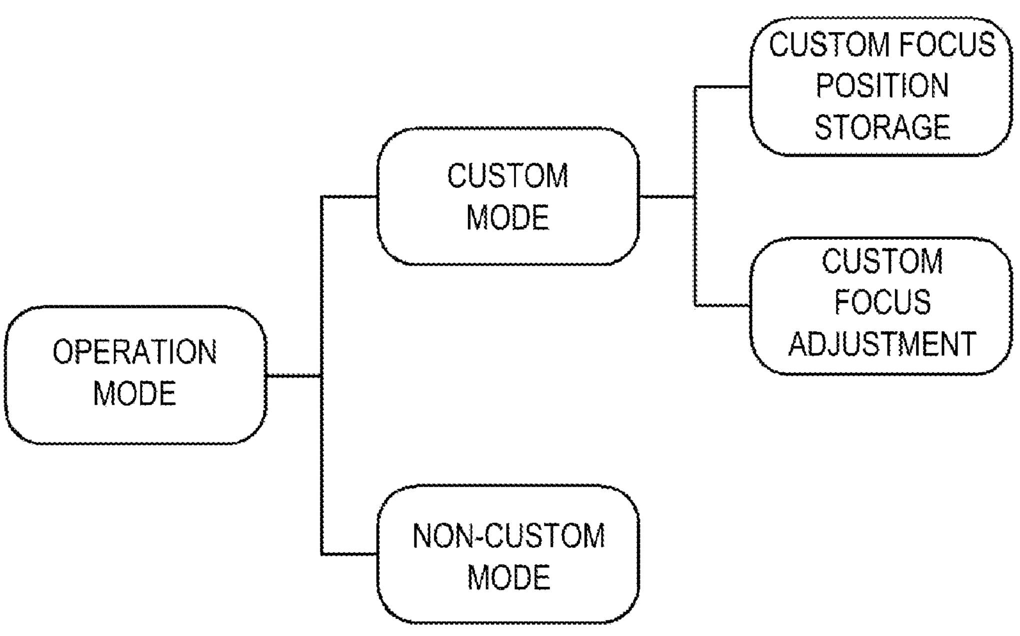
FIG. 3 illustrates the internal structure of the lens assembly illustrated in FIG. 2.
FIG. 4 is a diagram for explaining the operation mode of a control device.

FIG. 2 illustrates a lens assembly according to an embodiment of the present disclosure. FIG. 3 illustrates the internal structure of the lens assembly illustrated in FIG. 2. FIG. 4 is a diagram for explaining the operation mode of a control device.

Referring to FIGS. 2 and 3, the lens assembly 200 according to the embodiment of the present disclosure includes a barrel 210, an aperture 220, lenses 230, a driving unit 240, a focus adjusting unit 250, an input button 260, an output unit 270, and the control device 280.

The barrel 210 may provide a sealed space to accommodate the lenses 230 and the driving unit 240. The barrel 210 may include an opening, and external light may flow into the barrel 210 through the opening. The barrel 210 may be detachably coupled to the camera 100. As the barrel 210 is coupled to the camera 100, the lens assembly 200 may receive power from the camera 100 and communicate with the camera 100.

The barrel 210 may have an adapter 211 so as to be coupled to the camera 100. The adapter 211 may perform mechanical and electrical coupling to the camera 100. Through the mechanical coupling, the barrel 210 and the camera 100 can be firmly coupled together. Through the electrical coupling, the power of the camera 100 can be supplied to the lens assembly 200, or the communication between the camera 100 and the lens assembly 200 can be performed.

A power supply line 291 and a communication line 292 may be provided between the adapter 211 and the control device 280. The power supply line 291 may provide a movement path of the power of the camera 100. The communication line 292 may provide a movement path of communication signals between the camera 100 and the control device 280.

The aperture 220 is provided in the opening of the barrel 210 to control the amount of light flowing into the barrel 210. The aperture 220 may block at least a portion of the opening of the barrel 210. The amount of light flowing through the opening may vary according to the extent to which the aperture 220 blocks the opening of the barrel 210.

The lenses 230 focus light flowing into the barrel 210. An optical device may include a plurality of lenses 230. At least one of the lenses 230 may be a focusing lens 231. The focusing lens 231 may be moved within the barrel 210. For example, the focusing lens 231 may be moved in a direction parallel to an optical axis Ax. As the position of the focusing lens 231 changes, focal lengths of the lenses 230 may change.

The driving unit 240 moves the focusing lens 231 by generating a driving force with the power supplied from the camera 100. For example, the driving unit 240 may be provided in the form of a motor to generate a rotational force. The rotational force may be converted into a force for horizontally moving the focusing lens 231, and the focusing lens 231 may move along the optical axis Ax.

The focus adjusting unit 250 moves the focusing lens 231 using a driving force input from a user. The focus adjusting unit 250 may be provided in the form of a ring and may be disposed along the circumference of the barrel 210. The barrel 210 and the focus adjusting unit 250 may have the same central axis. The central axis may coincide with the optical axis Ax. The focus adjusting unit 250 may rotate about the central axis, and the rotational force may act as a driving force for moving the focusing lens 231. A user can manually adjust the focus of the lenses 230 by rotating the focus adjusting unit 250 with respect to the barrel 210.

The input button 260 may receive user commands. The input button 260 may be provided in a mechanical form. In this case, a user can input a user command by pressing the input button 260. Alternatively, the input button 260 may be provided in the form of a touch pad. In this case, the user may input a user command by touching the input button 260.

The output unit 270 outputs the operation mode of the control device 280. As will be described later, the operation mode of the control device 280 may include a custom mode and a non-custom mode. The output unit 270 may output whether the operation mode of the control device 280 is the custom mode or the non-custom mode. The output unit 270 may be provided in the form of a lamp. For example, the output unit 270 may include a light emitting diode (LED).

The output unit 270 may output light of a plurality of colors. In this case, the output unit 270 may output light of different colors in the custom mode and the non-custom mode.

The control device 280 may operate in the custom mode or the non-custom mode. Referring to FIG. 4, the operation mode of the control device 280 may include the custom mode and the non-custom mode. When the custom mode is selected as the operation mode, the control device 280 may store a custom focus position or adjust a custom focus. The custom focus position refers to a position set by a user. The user may set the position of the focusing lens 231 to implement a desired focus, and the set position of the focusing lens 231 is the custom focus position. In the custom mode, the user may store the custom focus position or adjust the custom focus so that the focusing lens 231 moves to the custom focus position.

In the present disclosure, the custom mode and the non-custom mode may be understood as a manual focus mode and an auto focus mode, respectively. In the custom mode, a user may adjust the focus of the lenses 230 by moving the focusing lens 231 using the focus adjusting unit 250. In the non-custom mode, the control device 280 may adjust the focus of the lenses 230 by moving the focusing lens 231 through the driving unit 240 according to a focus adjustment signal received from the camera 100.

When a custom focus adjustment command is input through the input button 260, the control device 280 may control the driving unit 240 to move the focusing lens 231 to a preset custom focus position. The control device 280 controls the driving unit 240 to move the focusing lens 231 to the custom focus position when the custom focus adjustment command is input after the operation mode is switched to the custom mode.

In addition, when a custom focus storage command is input after the operation mode is switched to the custom mode, the control device 280 may store a current position of the focusing lens 231 as the custom focus position. The focusing lens 231 may be moved by the focus adjusting unit 250, and the control device 280 may store the position of the focusing lens 231 moved by the focus adjusting unit 250 as the custom focus position. Later, when a custom focus adjustment command is input, the control device 280 may control the driving unit 240 to move the focusing lens 231 to the custom focus position.

Figure 5:
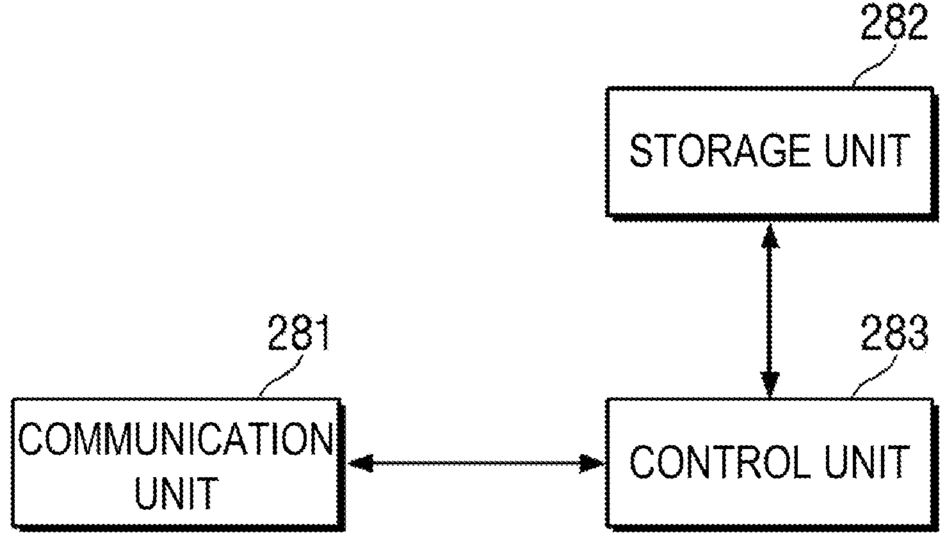
FIG. 5 is a block diagram of the control device illustrated in FIG. 3.

FIG. 5 is a block diagram of the control device illustrated in FIG. 3.

Referring to FIG. 5, the control device 280 includes a communication unit 281, a storage unit 282, and a control unit 283.

The communication unit 281 may communicate with the camera 100. The communication unit 281 may receive an operation signal of the camera 100 or transmit an operation signal of the control unit 283 to the camera 100. The control unit 283 may operate by referring to the operation signal of the camera 100, and the camera 100 may operate by referring to the operation signal of the control unit 283.

The storage unit 282 may store a custom focus position. In the present disclosure, the storage unit 282 may be provided in the form of read only memory (ROM). In other words, the storage unit 282 can keep storing the custom focus position even if the power supply from the camera 100 is interrupted. When the power supply from the camera 100 is interrupted and then resumed, the control unit 283 may perform custom focus adjustment using the custom focus position stored in the storage unit 282.

The control unit 283 may control custom focus position storage and custom focus adjustment. For example, when a custom focus storage command is input in the custom mode, the control unit 283 may control the storage unit 282 to store the current position of the focusing lens 231 as the custom focus position.

Alternatively, when a custom focus adjustment command is input through the input button 260 in the custom mode, the control unit 283 may control the driving unit 240 to move the focusing lens 231 to the custom focus position stored in the storage unit 282.

In addition, the control unit 283 may perform overall control over the aperture 220, the output unit 270, the driving unit 240, the communication unit 281, and the storage unit 282. For example, the aperture 220 may adjust the amount of light flowing into the barrel 210 by operating according to a control signal of the control unit 283. The output unit 270 may output light of different colors according to the control signal of the control unit 283.

Figure 6:
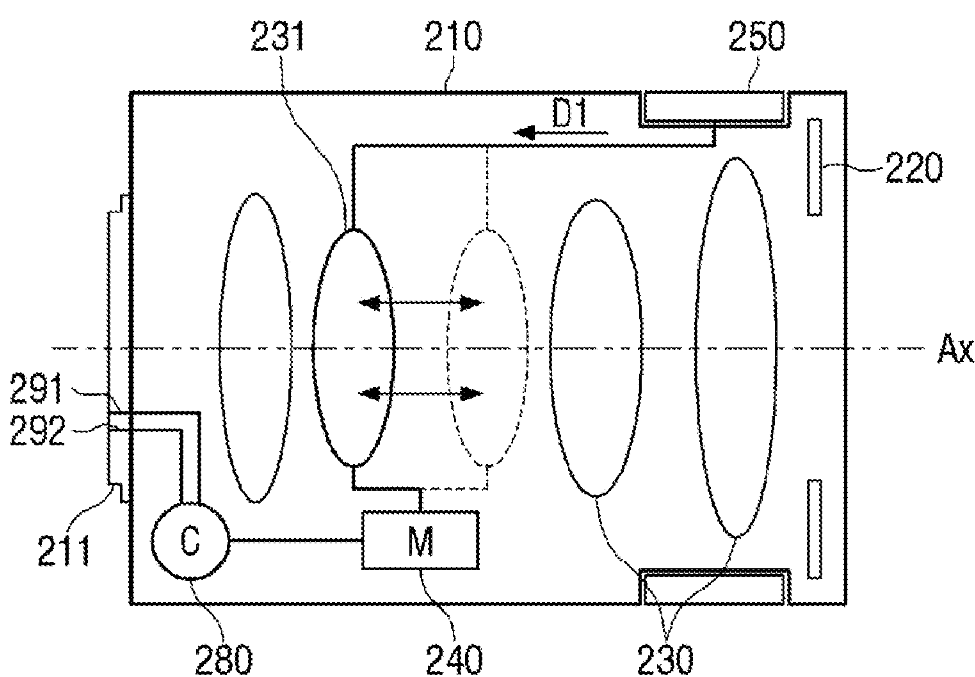
FIG. 6 is a diagram for explaining the movement of a focusing lens by a focus adjusting unit.
Figure 7:
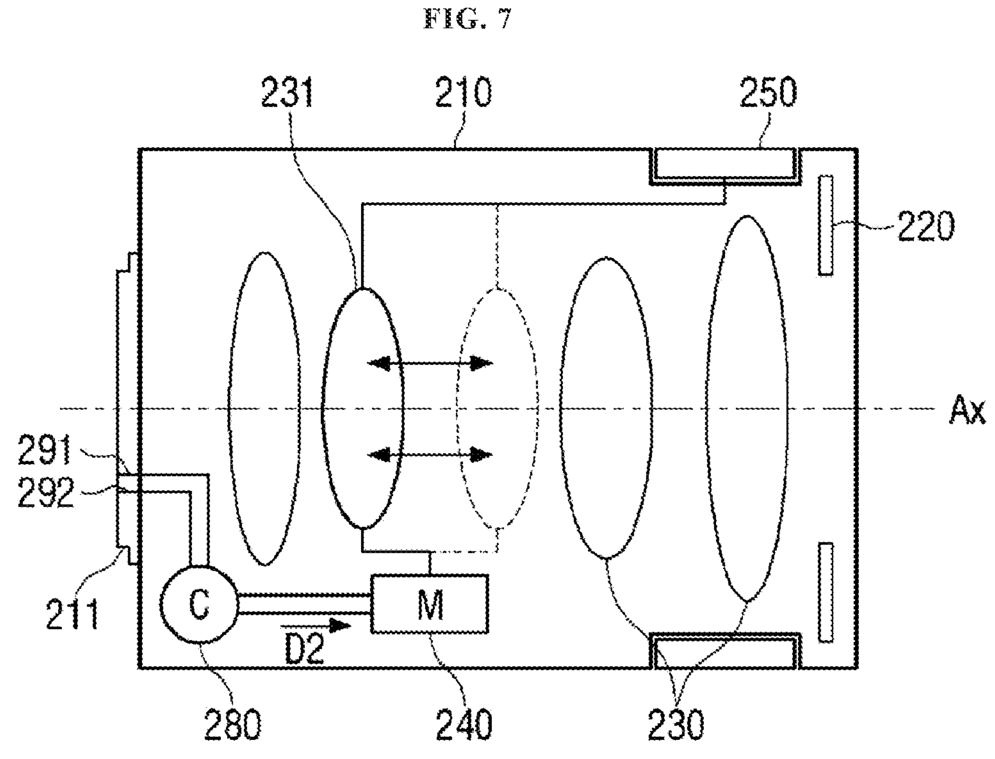
FIG. 7 is a diagram for explaining the movement of the focusing lens by a driving unit.

FIG. 6 is a diagram for explaining the movement of the focusing lens by the focus adjusting unit. FIG. 7 is a diagram for explaining the movement of the focusing lens by the driving unit.

Referring to FIG. 6, the focusing lens 231 may be moved by a driving force D1 generated by the focus adjusting unit 250.

A user may generate the driving force D1 by rotating the focus adjusting unit 250 with respect to the barrel 210. The focus of the lenses 230 may be adjusted as the focusing lens 231 is moved along the optical axis Ax by the driving force D1. The user may adjust the focus of the lenses 230 by operating the focus adjusting unit 250 after switching the operation mode of the control device 280 to the custom mode.

Referring to FIG. 7, the focusing lens 231 may be moved by a driving force D2 generated by the driving unit 240.

The driving unit 240 may generate the driving force D2 according to a control command of the control device 280. The focus of the lenses 230 may be adjusted as the focusing lens 231 is moved along the optical axis Ax by the driving force D2. The driving unit 240 may move the focusing lens 231 to a custom focus position in the custom mode or move the focusing lens 231 to an auto focus position in the non-custom mode.

Figure 8:
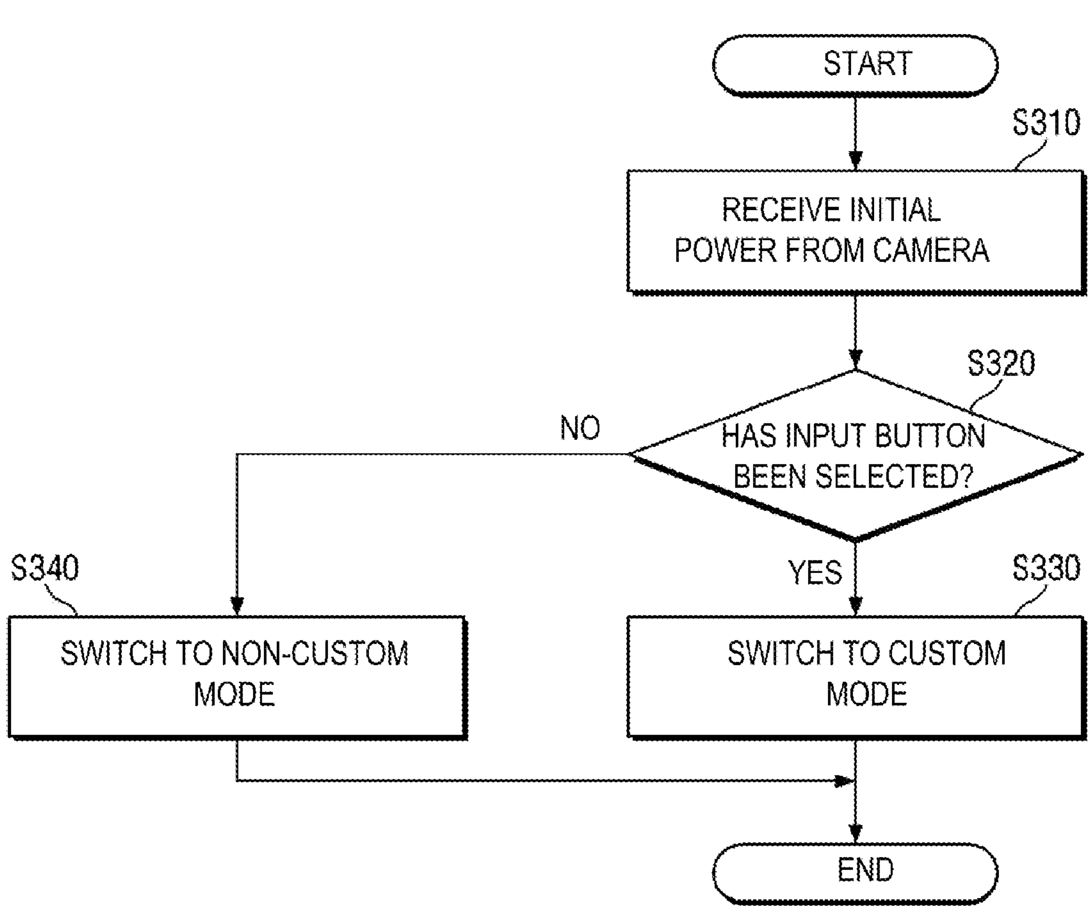
FIG. 8 is a flowchart illustrating a method of selecting the operation mode of the control device.

FIG. 8 is a flowchart illustrating a method of selecting the operation mode of the control device.

Referring to FIG. 8, the control device 280 may select the custom mode or the non-custom mode as its operation mode.

First, the control device 280 may receive initial power from the camera 100 (operation S310). The initial power refers to power newly supplied from the camera 100 in a state where no power is supplied to the lens assembly 200. For example, the power supplied within a certain time after the electrical coupling between the camera 100 and the lens assembly 200 may be understood as the initial power.

Next, the control device 280 may determine whether the input button 260 has been selected (operation S320). Therefore, when the control device 280 detects the selection of the input button 260 while receiving the initial power from the camera 100, it may switch its operation mode to the custom mode (operation S330). For example, when the camera 100 is turned off, a user may switch the operation mode of the control device 280 to the custom mode by turning on the camera 100 while selecting the input button 260. Alternatively, when the camera 100 is turned on, the user may switch the operation mode of the control device 280 to the custom mode by performing electrical coupling between the camera 100 and the lens assembly 200 while selecting the input button 260. When the operation mode is switched to the custom mode, the output unit 270 may output light of a color corresponding to the custom mode.

Meanwhile, when not detecting the selection of the input button 260 while receiving the initial power from the camera 100, the control device 280 may switch the operation mode to the non-custom mode (operation S340). For example, when the camera 100 is turned on, a user may switch the operation mode of the control device 280 to the non-custom mode by turning the camera 100 off and then turning the camera 100 on. Alternatively, when the camera 100 is turned on, the user may switch the operation mode of the control device 280 to the non-custom mode by eliminating the electrical coupling between the camera 100 and the lens assembly 200 and then coupling them again. When the operation mode is switched to the non-custom mode, the output unit 270 may output light of a color corresponding to the non-custom mode.

Figure 9:
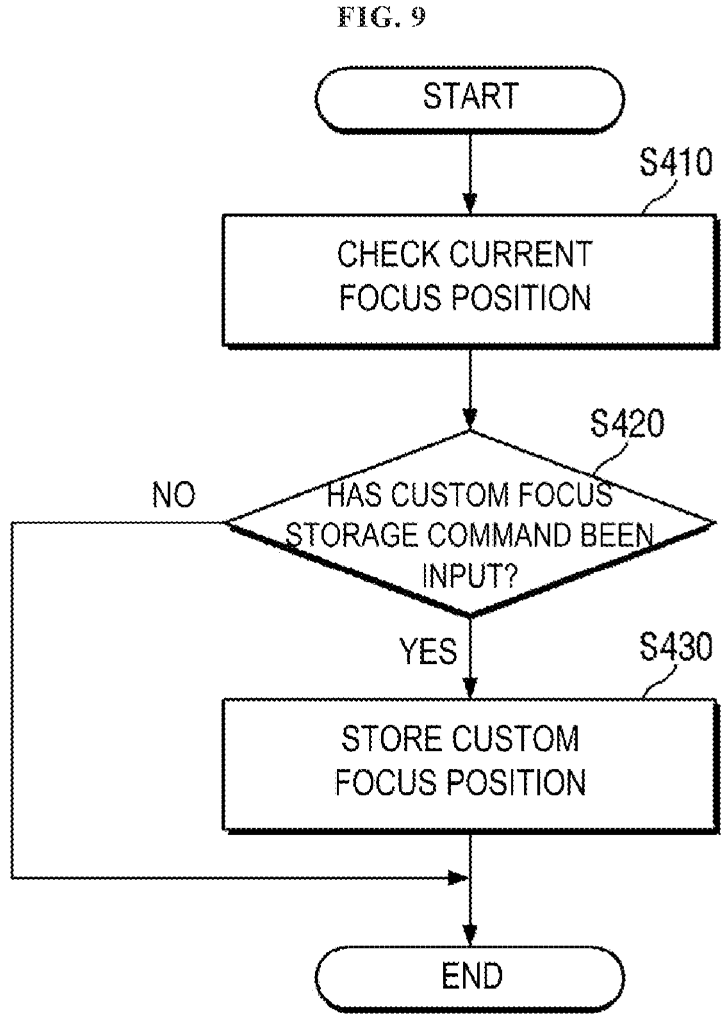
FIG. 9 is a flowchart illustrating a method of storing a custom focus position.
Figure 10:
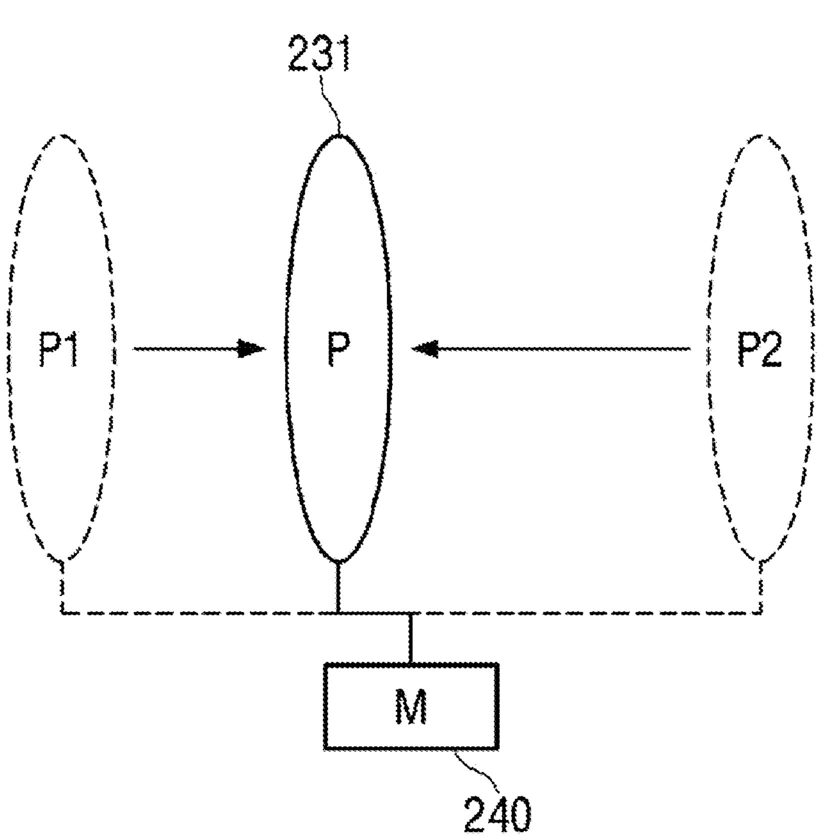
FIG. 10 is a diagram for explaining the movement of the focusing lens to the custom focus position.

FIG. 9 is a flowchart illustrating a method of storing a custom focus position. FIG. 10 is a diagram for explaining the movement of the focusing lens to the custom focus position.

Referring to FIG. 9, the control device 280 may store the custom focus position.

First, the control device 280 may check a current focus position (operation S410). In the custom mode, a user may adjust the focus position by moving the focusing lens 231 using the focus adjusting unit 250. For example, the user may adjust the focus position of the lenses 230 using the focus adjusting unit 250 while the aperture of the camera 100 is opened to the maximum. The control device 280 may continuously check the focus position adjusted by the focus adjusting unit 250.

Next, the control device 280 may check whether a custom focus storage command has been input (operation S420). The custom focus storage command may be input through the input button 260. The custom focus storage command may include selecting the input button 260 for more than a preset threshold time. For example, when the input button 260 is selected for more than 3 seconds in the custom mode, the control device 280 may determine that the custom focus storage command has been input.

When the custom focus storage command is input, the control device 280 may store the current focus position as a custom focus position (operation S430). The custom focus position may be stored in the storage unit 282. While storing the custom focus position, the control device 280 may transmit a communication signal indicating the completion of the storage to the camera 100. The camera 100 receiving the communication signal may output information indicating that the custom focus position has been stored. For example, if the camera 100 includes a display (not illustrated), the screen of the display may be turned off and then turned on again. Alternatively, text or an image indicating that the custom focus position has been stored may be displayed through the display.

Once the custom focus position is stored, the user can easily move the focusing lens 231 to the custom focus position. In the custom mode, the user can move the focusing lens 231 to the custom focus position by inputting a custom focus adjustment command. The custom focus adjustment command may include selecting the input button 260 for a preset threshold range of time. For example, when the input button 260 is selected for about 1 second in the custom mode, the control device 280 may determine that the custom focus adjustment command has been input.

When the custom focus adjustment command is input, the control device 280 may control the driving unit 240 to move the focusing lens 231 to the custom focus position. Referring to FIG. 10, when the custom focus adjustment command is input while the focusing lens 231 is located at point P1 or point P2, the driving unit 240 may move the focusing lens 231 to a custom focus position P.

A case where the focusing lens 231 moves to a custom focus position set by a user has been described above. However, if the custom focus position is not set by the user, the control device 280 may move the focusing lens 231 to a default focus position. The default focus position may be set at the time of manufacture of the lens assembly 200 and may be stored in the storage unit 282. When the custom focus adjustment command is input in the custom mode, the control device 280 may control the driving unit 240 to move the focusing lens 231 to the default focus position.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

The invention claimed is:

1. A lens assembly comprising:

a barrel detachably coupled to a camera;

a focusing lens;

a driving unit moving the focusing lens by generating a driving force with power supplied from the camera;

a single input button receiving a user command, wherein the user command comprises a custom focus storage command and a custom focus adjustment command; and a control device controlling the driving unit to move the focusing lens when the custom focus adjustment command is input through the single input button, wherein the focusing lens moves to a preset custom focus position when a custom focus position is preset, and moves to a default focus position when the custom focus position is not preset, wherein the custom focus adjustment command comprises selecting the single input button for a preset threshold range of time, wherein the custom focus storage command comprises selecting the single input button for more than a preset threshold time, wherein an operation mode of the control device comprises a custom mode and a non-custom mode, and wherein the lens assembly comprises an output unit including a light emitting diode (LED) which outputs the operation mode of the control device, and the output unit outputs light of different colors in the custom mode and the non-custom mode.

2. The lens assembly of claim 1, wherein the control device controls the driving unit to move the focusing lens to the custom focus position when the custom focus adjustment command is input after the operation mode is switched to the custom mode.

3. The lens assembly of claim 2, wherein the control device switches the operation mode to the custom mode when detecting the selection of the single input button while receiving initial power from the camera.

4. The lens assembly of claim 2, wherein the control device switches the operation mode to the non-custom mode when not detecting the selection of the single input button while receiving initial power from the camera.

5. The lens assembly of claim 1, wherein the control device stores a current position of the focusing lens as the custom focus position when the custom focus storage command is input after the operation mode is switched to the custom mode.

* * * * *